July 19, 1932.  C. W. THARP  1,868,122
LEVELER
Filed March 25, 1930  3 Sheets-Sheet 1
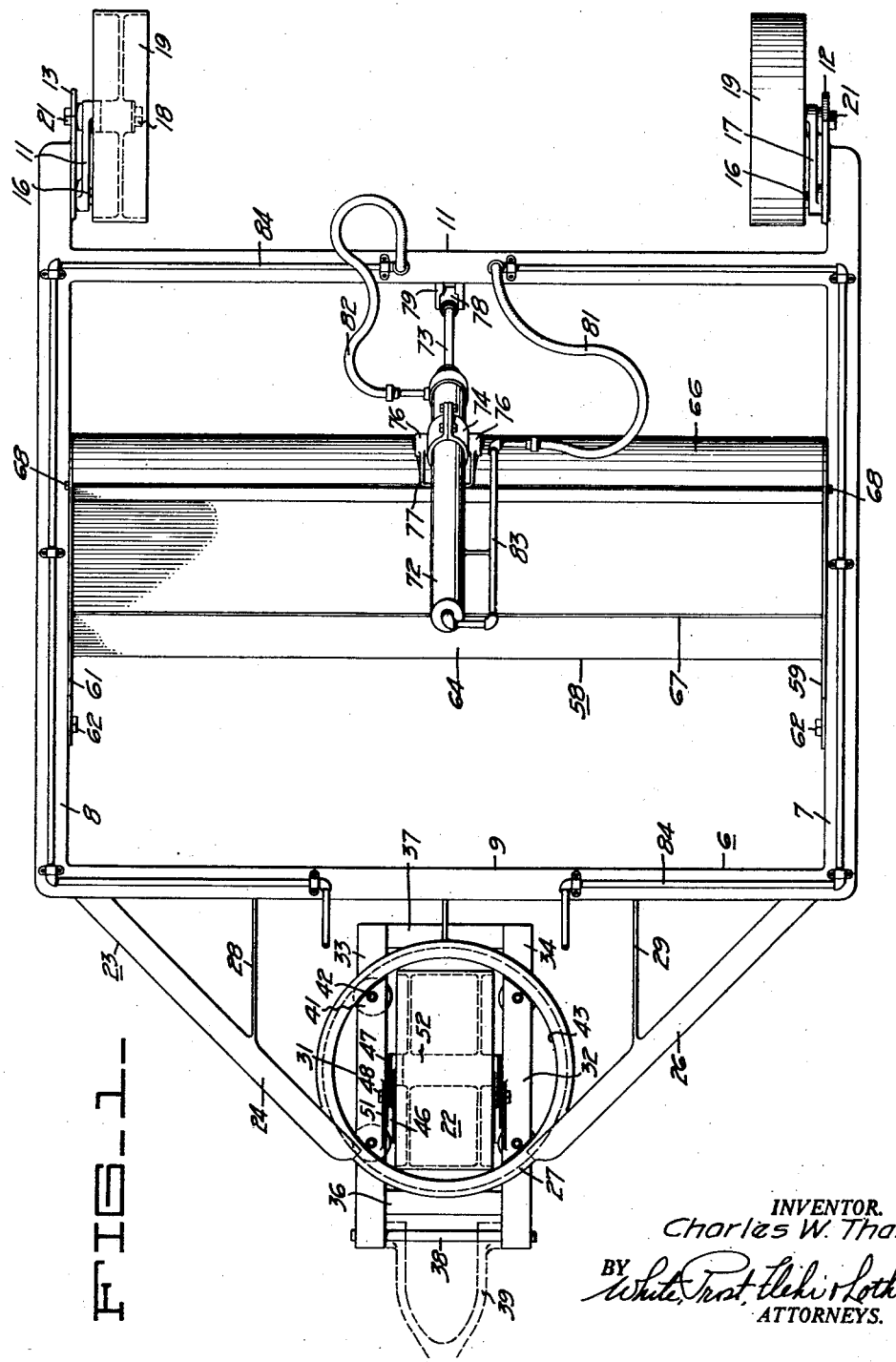

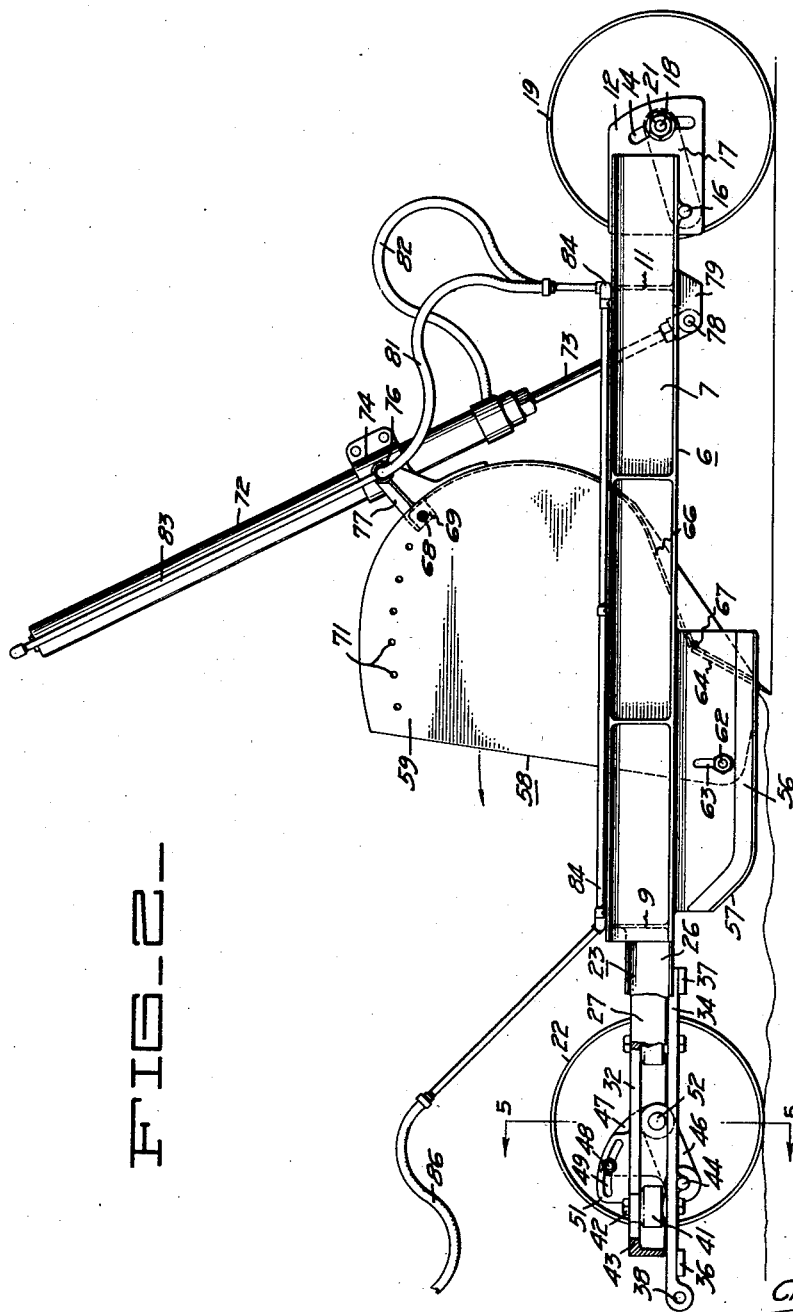

July 19, 1932.  C. W. THARP  1,868,122
LEVELER
Filed March 25, 1930   3 Sheets-Sheet 3

INVENTOR.
Charles W. Tharp
BY
ATTORNEYS.

Patented July 19, 1932

1,868,122

UNITED STATES PATENT OFFICE

CHARLES W. THARP, OF WATSONVILLE, CALIFORNIA

LEVELER

Application filed March 25, 1930. Serial No. 438,760.

My invention relates to devices for leveling land surfaces and is particularly related to levelers which are adjustable for operation under varying conditions of grading. Land levelers of the type referred to are disclosed in my copending application entitled "Leveler", filed January 25, 1930, under Serial Number 423,343.

An object of my invention is to provide a leveler which is an improvement over levelers previously known.

Another object of my invention is to provide a leveler which is rapidly adjustable to meet the various conditions of grading.

Another object of my invention is to provide a leveler of simple and sturdy construction.

A further object of my invention is to utilize power means in adjusting the leveler of my invention.

A further object of my invention is to provide a leveler which is adapted to be drawn by a draft vehicle and which can be operated entirely by the operator of such draft vehicle.

The foregoing and other objects are attained in the embodiment of the invention shown in the drawings, in which Fig. 1 is a plan of a leveler constructed in accordance with my invention.

Fig. 2 is a side elevation of my leveler.

Figure 4:
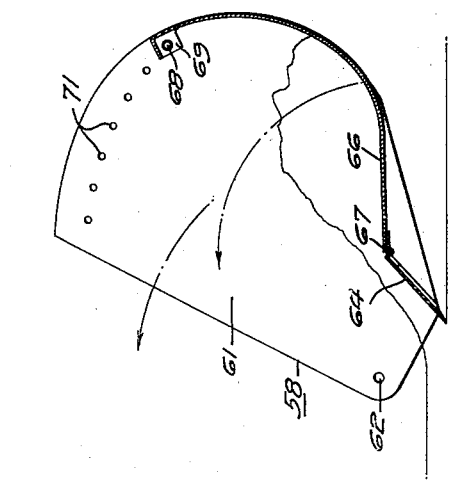
Fig. 4 is a cross section of the scoop on a vertical longitudinal plane showing the scoop and blade in earth-carrying position.
Figure 5:
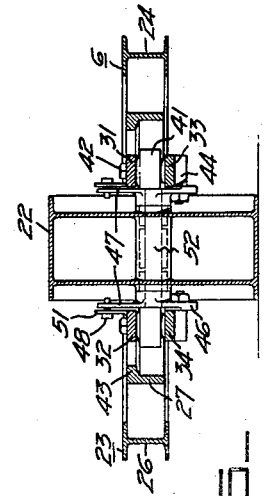
Fig. 5 is a cross section on the line 5—5 of Fig. 2.

In its preferred form, the grader of my invention includes a framework mounted on ground engaging members for variable spacing with respect to the ground and further comprises a scoop mounted on the framework and provided with an adjustable plate adapted to be hydraulically displaced with respect to the framework.

Although the leveler of my invention can be embodied in a plurality of forms and although its design may be changed to meet variable conditions, I have chosen to illustrate herein one form of my invention which in practice has given satisfactory results.

In constructing my leveler I preferably provide a framework 6 conveniently fabricated of structural shapes such as channels and including side members 7 and 8 joined by a forward cross member 9 and a rearward cross member 11. To simplify the construction and to provide a sturdy mechanism I preferably join the cross members and the side members by welding and in fact prefer to employ welding as a fastening means throughout the construction of the apparatus. The side members 7 and 8 are each extended rearwardly and are welded to vertical plates 12 and 13 in which arcuate slots 14 are provided. Secured to each of the side members 7 and 8 is a stud 16 on which a crank 17 is rotatably mounted. Passing through the respective slots 14 and also the cranks 17 are stub axles 18 at their extremities carrying ground engaging members such as wheels 19.

Since the wheels 19 are rotatable on the axles 18 and since the axles in turn are held in the cranks 17 which are movable about members 16 as pivots, it is possible to vary the spacing between the rear end of the framework 6 and the ground and also to clamp the ground engaging members 19 in adjusted position by virtue of lock nut 21 provided on the extremities of axles 18.

At the forward end of framework 6 I provide a similar ground engaging member such as the wheel 22. In order to permit the leveler to be turned sharply by the draft vehicle and in order to provide a suitable three point support for the framework 6 I preferably mount the wheel 22 in a forward extension 23 of the framework. Projecting from the forward cross member 9 are converging side rails 24 and 26 which are joined at forward ends to a ring 27. Braces 28 and 29 span the space between the forward cross member 9 and the rails 24 and 26 in oder to reinforce the forward extension of the framework 6.

To co-operate with the ring 27 to provide a mounting for the wheel 22 I preferably provide a carriage including a pair of parallel top beams 31 and 32 which overlie and are in registry with a parallel pair of bottom beams 33 and 34. The top beams 31 and 32 terminate within the ring 27 while the bottom beams 33 and 34 underlie the ring and extend beyond the confines thereof.

To afford a sturdy draft connection the bottom beams 33 and 34 are preferably joined proximate their extremities with cross straps 36 and 37 while a rod 38 passing through the members 33 and 34 can receive a draft hitch 39 as indicated in Fig. 1.

Disposed between the upper beams 31 and 32 and the corresponding lower beams 33 and 34 I provide a plurality of rollers 41 each of which is mounted on a spindle 42 passing through the registering beams. The rollers are adapted to run on the inner vertical periphery of the ring 27 and are borne upon by an inturned flange 43 projecting from the inner periphery of the ring 27. Loads upon the framework 6 and the forward extension thereof are thus transmitted to the ring 27 and through the rollers 41 to the upper and lower pairs of parallel beams adjacent the ground engaging wheel 22. The carriage provided by the beams is freely rotatable within the ring 27 so that the draft vehicle connected to the hitch 39 can alter its path through approximately 180° in order to direct or guide the leveler framework 6.

In order to connect the wheel 22 of the forward extension 23 for variable spacing of the forward end of the framework 6 with respect to the ground I preferably provide a pair of pivot pins 44 on the two lower beams 33 and 34. On each of the pins 44 a crank 46 is mounted and is provided with an extension 47 carrying a locking bolt 48 adapted to run in an arcuate slot 49 piercing a plate 51 secured to the upper beam members 31 and 32. With this arrangement it is possible to dispose the crank 46 in any desired pivotal position about its pin 44. Joining the two cranks 46 so provided is an axle 52 on which the wheel 22 is rotatably mounted.

Figure 3:
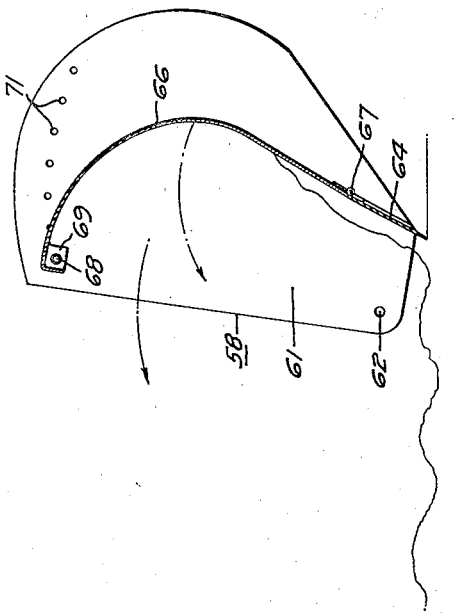
Fig. 3 is a cross section through the scoop on a vertical longitudinal plane, showing the scoop and plate in grading position.

To effect the leveling and grading operations by the removal of earth and the deposition thereof I preferably dispose beneath each of the side members 7 and 8 a runner 56 having an upturned leading edge 57 for facilitating the progress of the runner over the ground during those times when it is in contact therewith and mount on the pair of runners so formed a scoop generally designated 58. The scoop usually includes a pair of side plates 59 and 61 at their leading and lower corners provided with pivot pins 62 passing through vertical slots 63 cut in the runners 56 so that the side plates can be vertically adjusted with respect to the framework 6 and at the same time are pivotally mounted thereon. Joining the side plates 59 and 61 is a blade 64 having its lower edge formed for operation on the ground. Connected to the blade 64, preferably by a hinge or pivotal connection, is a plate 66 of a generally arcuate contour. The plate is not connected fixedly to the side members 59 and 61 but in addition to being connected to the blade 64 by a hinge 67 is variably fastened to the side plates by virtue of removable bolts 68 passing through ears 69 on the plate and also through any selected one of a series of apertures 71 piercing the side plates 59 and 61. As particularly indicated in Figures 3 and 4, the plate 66 can be held in any selected pivotal position with respect to the side plates 59 and 61 and with respect to the blade 64.

In order to pivot the scoop about its pivotal axis to effect the various maneuvers necessary in land leveling I preferably provide a hydraulically actuated mechanism. This, in its preferred form, includes a hydraulically expansible chamber afforded by a metal cylinder 72 in which a piston 73 operates. The cylinder is provided with a collar 74 carrying trunnions 76 for pivotal attachment to a bracket 77 affixed to the plate 66 while the piston 73 at its lower end is pivotally connected as at 78 to a fork 79 secured to the rearward cross member 11. The expansible chamber confined by the cylinder and piston is thus interposed between and pivotally connected to the scoop and the framework.

For controlling the position of the piston 73 in the cylinder 72 and correspondingly controlling the relationship of the scoop to the framework I provide a pair of hydraulic conduits 81 and 82. These are preferably flexible hoses of the customary kind. The conduit 81 preferably is joined coaxially with the trunnion 74 to a pipe 83 extending to the upper end of the cylinder 72 and affording communication with the upper end of the cylinder above the piston. The conduit 82 preferably is connected to the lower end of the cylinder for providing communication beneath the piston and at the lower end of the cylinder 72. Each of the conduits 81 and 82 is joined to a duct 84 fastened to suitable portions of the framework 6 and extending forwardly to other flexible hoses such as 86 leading to the draft vehicle upon which any ordinary hydraulic pump and valve arrangement, not shown, is provided. It will be understood that the piston and cylinder arrangement is hydraulically controlled in accordance with the wishes of the operator to pivot the scoop about its pivotal axis on the framework 6 so that the leading edge of the blade 64 is related as desired to the ground.

In the operation of my leveler it is possible to make all of the adjustments of the various wheels with respect to the ground with the aid of the hydraulic cylinder. For instance, by using the forward wheel 22 as a fulcrum and extending the expansible chamber with the scoop in contact with the ground the rearward end of the framework can be raised and lowered thereby facilitating he adjustment of the rearward wheels verically and their subsequent fastening in adjusted position. Correspondingly, by utilizing the rearward wheels as a fulcrum and by permitting the scoop to bear against the ground it is possible upon extension of the expansible chamber to lift the forward wheel 22 for adjusting purposes. Furthermore, the scoop itself is readily rotatable about its pivotal axis upon expansion and contraction of the hydraulic mechanism and further by holding the scoop from rotation after detaching the fastenings 68 it is possible to relate the plate 66 to the scoop in any desired fashion, for instance, as in Figure 3 for scraping and in Figure 4 for carrying earth.

It is to be understood that I do not limit myself to the form of the leveler shown and described herein, as the invention, as set forth in the following claims may be embodied in a plurality of forms.

I claim:

1. A leveler comprising a framework, ground-engaging members, means for variably spacing said framework from said ground-engaging members, a scoop pivotally mounted on said framework; said scoop including a plate pivotally mounted thereon, means for constraining the pivotal movement of said plate on said scoop and a hydraulically expansible chamber pivotally connected to said plate and to said framework.

2. A leveler comprising a framework, ground-engaging wheels mounted on said framework for variable vertical spacing relative thereto, a scoop pivotally mounted on said framework; said scoop including a plate pivotally mounted thereon, means for constraining the pivotal movement of said plate on said scoop, and a hydraulically expansible chamber connected to said plate and to said framework.

3. A leveler comprising a framework, means for variably spacing said framework with respect to the ground, a scoop pivotally mounted on said framework; said scoop including a plate pivotally mounted thereon, and a hydraulically expansible chamber connected to said plate and to said framework.

4. A leveler comprising a framework, means for variably spacing said framework with respect to the ground, a scoop pivotally mounted on said framework; said scoop including a plate pivotally mounted thereon, means for constraining the pivotal movement of said plate on said scoop, and a hydraulically expansible chamber connected to said plate and to said framework.

5. A leveler comprising a framework, a scoop pivotally mounted on said framework; said scoop including a plate pivotally mounted thereon, and a hydraulically expansible chamber connected to said plate and to said framework.

6. A leveler comprising a framework, a scoop pivotally mounted on said framework, said scoop including a blade thereon, a plate pivotally mounted on said blade, and means connected to said plate and to said framework for pivoting said scoop on said framework.

7. A leveler comprising a framework, a scoop pivotally mounted on said framework, said scoop including a blade thereon, a plate pivotally mounted on said blade, means for holding said plate in a selected pivotal position on said blade, and a hydraulically expansible device connected to said plate and to said framework for pivoting said scoop on said framework.

8. A leveler comprising a framework, a scoop on said framework and tiltable with respect thereto; said scoop including a plate pivotally mounted thereon, means for constraining the pivotal movement of said plate on said scoop, and means connected to said plate and to said framework for moving said scoop relative to said framework.

In testimony whereof, I have hereunto set my hand.

CHARLES W. THARP.